US006829996B2

(12) United States Patent
Jung et al.

(10) Patent No.: US 6,829,996 B2
(45) Date of Patent: Dec. 14, 2004

(54) METHOD AND APPARATUS FOR PROCESSING A PRINTING INK CONTAINING INHIBITORS AND OLIGOMERS IN A PRINTING UNIT

(75) Inventors: Ulrich Jung, Limburg (DE); Thomas Walther, Freigericht (DE)

(73) Assignee: MAN Roland Druckmaschinen AG, Offenbach/Main (DE)

( * ) Notice: Subject to any disclaimer, the term of this patent is extended or adjusted under 35 U.S.C. 154(b) by 54 days.

(21) Appl. No.: 10/264,044

(22) Filed: Oct. 3, 2002

(65) Prior Publication Data

US 2003/0066452 A1 Apr. 10, 2003

(30) Foreign Application Priority Data

Oct. 4, 2001 (DE) ........................................ 101 49 009

(51) Int. Cl.[7] ............................ B41F 3/28; B41F 23/04; C09D 11/02

(52) U.S. Cl. .................................... 101/491; 101/424.1

(58) Field of Search ................................ 101/216, 141, 101/153, 424.2, 424.1, 491; 118/46

(56) References Cited

U.S. PATENT DOCUMENTS

| | | | | |
|---|---|---|---|---|
| 3,673,135 A | * | 6/1972 | Blake et al. | 527/314 |
| 5,097,764 A | * | 3/1992 | Waizmann | 101/425 |
| 6,143,074 A | * | 11/2000 | Komori | 118/209 |
| 6,443,058 B1 | * | 9/2002 | Stadler et al. | 101/23 |

FOREIGN PATENT DOCUMENTS

| | | | | |
|---|---|---|---|---|
| DE | 3702218 A | * | 10/1987 | B41F/23/04 |
| JP | 59029197 A | * | 2/1984 | B41M/7/00 |
| JP | 02122974 A | * | 5/1990 | B41M/1/06 |

* cited by examiner

*Primary Examiner*—Daniel J. Colilla
(74) *Attorney, Agent, or Firm*—Leydig, Voit & Mayer, Ltd.

(57) ABSTRACT

A method and apparatus for processing a printing ink containing inhibitors and oligomers in a printing unit of a rotary printing machine in which the drying times of the printing ink on the printing material is shortened and the printing quality improved. In the illustrated embodiments, the printing unit includes two cylinders that form a press nip in which the printing ink is applied to passing printing material, and a catalyst mixture is applied to the printing material either by one of the cylinders or through an applicator device downstream of said press nip. A heating device is located in the conveying direction immediately downstream of the press nip or the applicator device.

16 Claims, 2 Drawing Sheets

METHOD AND APPARATUS FOR PROCESSING A PRINTING INK CONTAINING INHIBITORS AND OLIGOMERS IN A PRINTING UNIT

FIELD OF THE INVENTION

The invention relates to a method and an apparatus for processing printing ink containing inhibitors and oligomers in a printing unit of a rotary printing machine.

BACKGROUND OF THE INVENTION

A printing ink which contains inhibitors and oligomers and is preferably solvent-free and has constituents that can crosslink. While the inhibitors prevent crosslinking of the ink constituents, the inhibitors break down as the result of splitting of the ink into a thin ink film (the principle of ink splitting) and under the action of oxygen in the air.

A disadvantage in the processing of printing ink of this type is that, for specific applications, in particular subsequent processing, the printing ink is not sufficiently dried on the printing material.

OBJECTS AND SUMMARY OF THE INVENTION

It is an object of the present invention to provide a method and apparatus for processing printing ink containing inhibitors and oligomers of the foregoing type in which the ink has shortened drying times and can be used with improved printing quality.

A first advantage of the invention is that the printing ink when applied on the printing material can be dried much faster. As a result, further processing of the printing material can be carried out more efficiently in a rotary printing machine.

A further advantage is that processing of the printing ink can be implemented in a number of the most important printing processes, such as wet offset (using damping solution), dry offset (free of damping solution), letterpress printing, and flexographic printing.

Specifically in offset printing units having damping units (wet offset) or offset printing units for printing free of damping solution (dry offset), it is advantageous to accelerate the drying process for the printing ink by adding a catalyst which accelerates the breakdown of the inhibitors to the damping solution (wet offset) or to the printing ink (dry offset). In this case, it is not necessarily required to introduce the catalyst into all of the offset printing units. Depending on the desired state of drying of the printing ink on the printing material, the catalyst may be added only in selected of the offset printing units. Preferred offset printing units for the addition of catalysts are—as considered in the conveying direction of the printing material—printing units which are arranged upstream of a sheet turning device and/or a varnishing unit and/or upstream of a sheet deliverer.

Alternatively, in varnishing units operating with a letterpress printing process or a planographic printing process, it is advantageous that the drying of the varnish be accelerated by means of the addition of a catalyst to the varnish that accelerates the breakdown of the inhibitors. Here too, the use of a catalyst is not absolutely necessary in all varnishing units (in the event of a multiple arrangement of varnishing units). Depending on the desired state of drying of the varnish on the printing material, the catalyst can be introduced in selected varnishing units.

Thus, it also is advantageous that the method and apparatus are not restricted to the processing of a printing ink containing inhibitors and oligomers; the process of a varnish containing inhibitors and oligomers can likewise be implemented. The term printing ink, as used herein, therefore also includes such a varnish.

Other objects and advantages of the invention will become apparent upon reading the following detailed description and upon reference to the drawings, in which:

Figure 1:
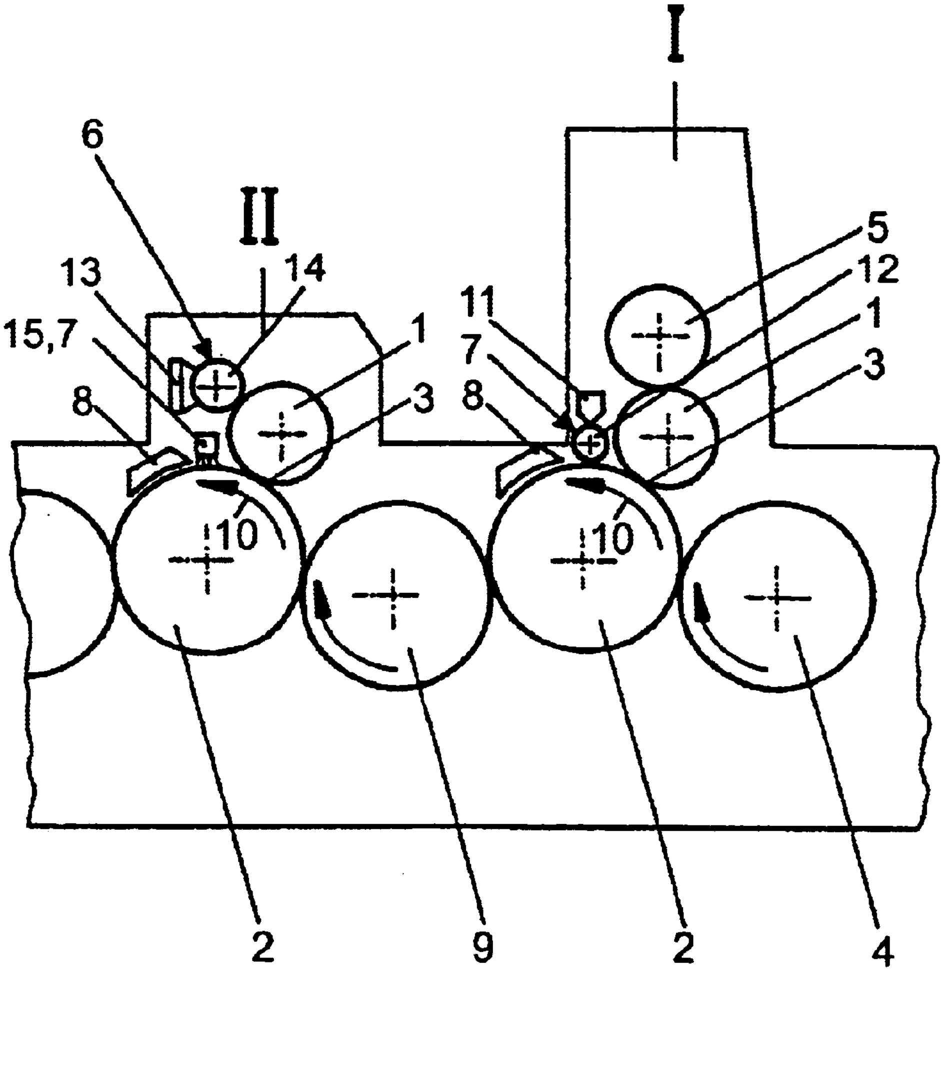
FIG. 1 is a partially diagrammatic side elevational view of a rotary printing machine in accordance with the invention having at least one printing unit and at least one varnishing unit.

While the invention is susceptible of various modifications and alternative constructions, certain illustrative embodiments thereof has been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Referring now more particularly to FIG. 1 of the drawing, there is a shown a rotary printing machine which includes a plurality of printing units for multicolor printing, for example offset printing units, in an in-line design (only one of which is illustrated). A varnishing unit II is arranged downstream of the last printing unit I in the conveying direction 10 of the printing material. The printing material is transported in the conveying direction 10 by means of cylinders 2 of the printing and varnishing units and intermediate transfer cylinders 4.

The printing unit I includes a plate cylinder 5 which, for example, carries a replaceable printing forme, and is in contact with a cylinder 1. Alternatively, an image can be set directly on the plate cylinder 5, for example by the thermal transfer process, and the printing image produced on the plate cylinder 5 can be erased.

In the illustrated embodiment, the cylinder 1 is a blanket cylinder in contact with the cylinder 2, which is a sheet carrying cylinder. Alternatively, the cylinder 2 can be designed as an impression cylinder or blanket cylinder. In order to transfer printing ink supplied by the cylinder 1 and containing inhibitors and oligomers to the printing material, a press nip 3 (or a varnishing nip 3 in the case of varnishing units) is formed in the contact area of the cylinders 1, 2. The plate cylinder 5 is at least coupled to an inking unit, upstream of which a damping unit may be arranged if required.

In carrying out the invention, an applicator device 7 is arranged downstream, preferably immediately downstream of the press nip 3 formed by the cylinders 1, 2. If a sheet directing or carrying device, for example a blown air device, is arranged downstream of the press nip 3, then the applicator device 7 is arranged downstream of the sheet directing and carrying devices in the conveying direction 10. The applicator device 7 preferably includes an applicator roll 12 which can be set on and off in the direction of the cylinder 2, and is connected to a supply device, for example a supply container 11, arranged upstream. The applicator roll 12 preferably has a resilient outer covering.

Figure 2:
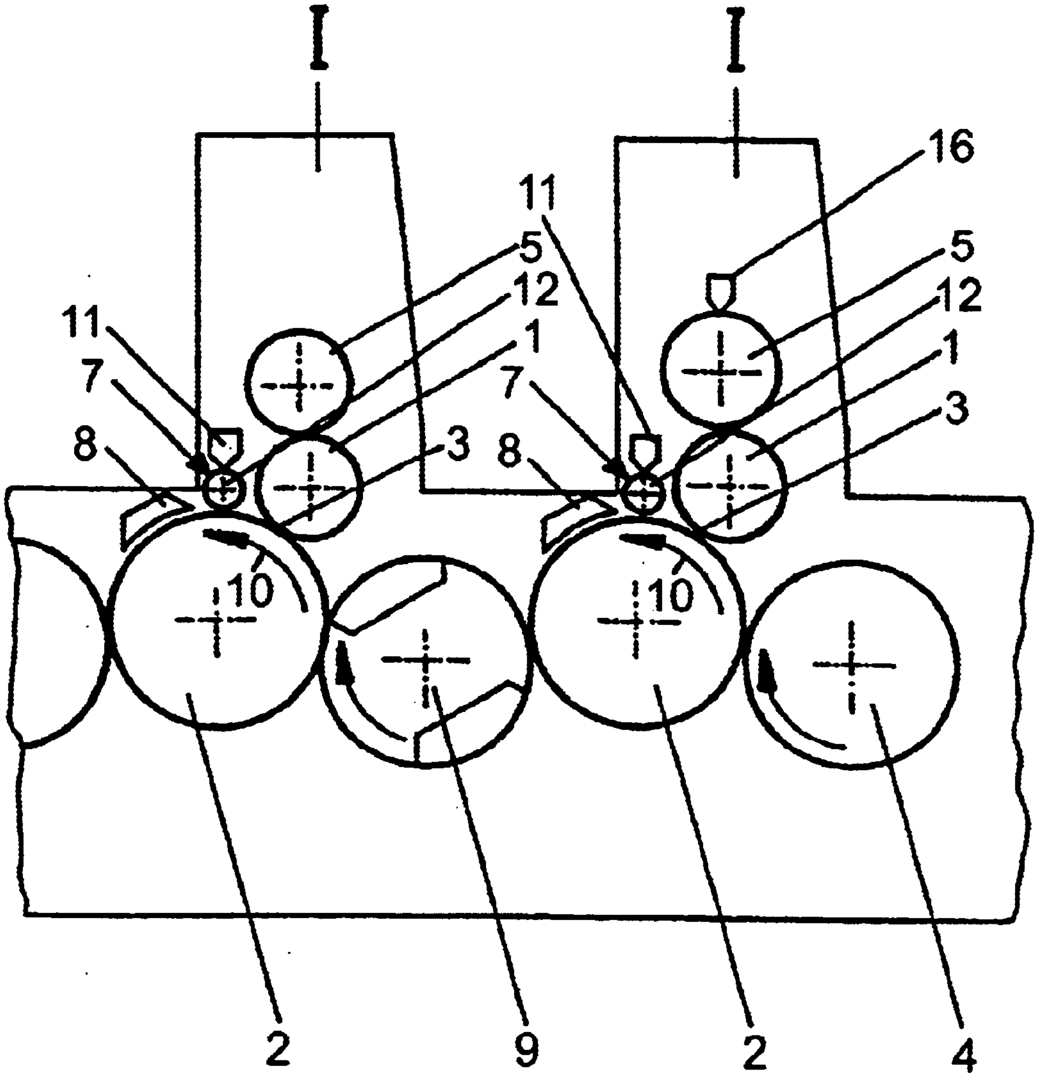
FIG. 2 shows an alternative embodiment of a rotary printing machine having a turner device arranged between two printing units.

In further carrying out the invention, a thermally active dryer device 8 in this case is arranged downstream of the applicator device 7 in the conveying direction 10. The illustrated dryer device 8, as shown in FIGS. 1 and 2, is arranged adjacent to and at a defined distance from the cylinder 2. Alternatively, a separate drier section also can be arranged downstream of the cylinder 2, for example in association with a plurality of transfer cylinders when processing sheet material, or an endlessly circulating chain system, in each case having at least one dryer device or dryer systems when processing web material.

In the varnishing unit II (FIG. 1), a cylinder 1, for example, a forme cylinder with a replaceable varnishing forme, is coupled to a metering system 6 having at least one applicator roll, for example formed by a chamber-type doctor 13 and an engraved applicator roll 14.

Alternatively, known two-roll units having a common nip with varnish supplied into the nip, or a roll system on the dip/scoop roll principle with a roll dipping into a container (with varnish/ink), together with at least one applicator roll, can be used as metering systems.

The cylinder 1 is in contact with the cylinder 2 in a varnishing nip 3 in order to transfer the varnish supplied by the cylinder 1 and containing inhibitors and oligomers to the printing material. In the present example, the cylinder 2 is constructed as a sheet carrying cylinder in a way analogous to the cylinder 2 in the printing unit I.

In a way analogous to the printing unit I, in the conveying direction 10, an applicator device 7 is arranged downstream, preferably immediately downstream, of the cylinder 1 which is constructed as a forme cylinder. The applicator device 7 is arranged in the varnishing unit II as a spray device, for example, which extends over the maximum printing material width.

Preferably, a thermally active dryer device 8 again is arranged downstream of the applicator device 7 in the conveying direction 10. In this case, the dryer device 8—as shown in FIGS. 1 and 2—is arranged adjacent to and at a defined distance from the cylinder 2. Alternatively, a separate drier section can also be arranged downstream of the cylinder 2, for example in association with a plurality of transfer cylinders when processing sheet material or an endlessly circulating chain system, in each case having at least one dryer device or dryer systems when processing web material.

Referring to FIG. 2, two identical printing units I are shown. Arranged between the two cylinders 2 is a turning device 9, which functions as a sheet carrying cylinder as well as turning the sheet printing material within the printing machine using the principle of trailing-edge turning. A dryer device 8 preferably is arranged upstream of the turner device 9. This arrangement is advantageous in that the printing material is noticeably drier before being transferred to the turner device 9, and the printed side is set off noticeably less during the turning process or on the downstream cylinder 2.

The method sequences according to the invention may be carried out consistent with two basic principles.

The method sequences according to the 1st principle are as follows:

In a press/varnishing nip 3 formed by the two cylinders 1, 2, the printing ink or the varnish is applied by at least one inked cylinder 1, 2 to a printing material, preferably in accordance with the printing subject and, after passing through the press/vanishing nip 3, the printing ink adhering to the printing material or the varnish adhering to the printing material has applied to it a catalyst mixture that accelerates the breakdown of the inhibitors. As a result, the crosslinking process of the printing ink or of the varnish is accelerated significantly so that the drying times for the ink or of the varnish are shortened.

In one preferred embodiment, the printing ink or the varnish is applied to one side of the printing material by a cylinder 1 constructed as a blanket cylinder or forme cylinder, and the catalyst mixture is then applied to the printing ink or the varnish adhering to the printing material. In a further embodiment, the printing ink or the varnish is applied to both sides of the printing material by two cylinders 1, 2 constructed as blanket cylinders or forme cylinders (rubber against rubber principle), and then the catalyst mixture is applied to both sides of the printing ink or the varnish adhering to both sides of the printing material.

In a further embodiment, at least one, preferably each printed side of the printing material is dried thermally on each printed side following the application of the catalyst mixture.

When a turner device is arranged within the rotary printing machine, the catalyst mixture is applied to the printing material immediately in the printing unit before the turning.

The method sequences according to the 2nd principle are as follows:

In a press/varnishing nip 3 formed by two cylinders 1, 2, the printing ink or the varnish is applied to a printing material by at least one inked cylinder 1, 2, preferably in accordance with the printing subject. In this case, the inked cylinder 1, 2 also carries a catalyst mixture which accelerates the breakdown of the inhibitors. The catalyst mixture has a defined reaction time so that the crosslinking process of the ink or of the varnish for accelerating the drying takes place after the press/varnishing nip 3 has been passed.

At least one inking unit, preferably having at least one roll train, is preferably assigned to the plate cylinder 5 of a printing unit. In this case, the catalyst mixture is applied to the plate cylinder 5 by means of an inking unit. For this purpose, for example, the catalyst mixture is added into an ink fountain 16 accommodating the specific printing ink and is supplied to the plate cylinder 5 together with the printing ink via the roll train. Alternatively, the catalyst mixture is supplied to a roll in the inking unit which carries the specific printing ink and is supplied to the plate cylinder 5 together with the printing ink.

In a further preferred embodiment, a damping unit is arranged upstream of the inking unit and the plate cylinder 5 in the direction of rotation of the latter. In this embodiment, the catalyst mixture is added to the damping solution, so that the damping solution and the catalyst mixture is transferred to a plate cylinder by means of an applicator roll. Depending on the construction of the damping unit, the damping solution and the catalyst mixture can also be completely or partly transferred into the inking unit and transferred from the inking unit to the plate cylinder 5, together with the printing ink, by means of at least one applicator roll.

In particular in the case of a varnishing unit II having cylinders 1, 2 and a press/varnishing nip 3 and also a metering system having at least one applicator roll, the catalyst mixture is transferred to at least one of the cylinders 1, 2, preferably the forme cylinder, via this applicator roll. In this case, the crosslinking of the printing ink or of the varnish also takes place downstream of the press/varnishing nip 3.

In this case, at least one, preferably each printed or varnished side of the printing material is preferably dried thermally after the inking or varnishing and the preferred, simultaneous application of the catalyst mixture. If a turner device is arranged in the rotary printing machine, then the catalyst mixture is preferably applied immediately to the printing material in the printing unit I or varnishing unit II before the turning.

It will be understood that the method sequences according to principles 1 and 2 described above are not restricted to the presence of printing ink or varnish in the printing unit I or varnishing unit II supplying the catalyst mixture. Instead, the catalyst mixture can also be applied separately to at least one of the cylinders 1, 2 in a printing or varnishing unit I, II that is not involved in the printing or varnishing. Likewise, the catalyst mixture can be processed separately or mixed with the printing ink or the varnish, alternatively with the damping solution.

In summary, the machine configuration is constructed substantially as follows:

In a first embodiment, in the conveying direction 10 of a printing material, at least one applicator device 7 having an applicator roll 12 for applying a catalyst mixture to the printed side of the printing material is arranged downstream of a press/varnishing nip 3 formed by two cylinders 1, 2. In a second embodiment, in the conveying direction 10 of a printing material, at least one applicator device 7 having a spray device 15 pointing parallel to the cylinder axes (cylinders 1, 2) for applying a catalyst mixture to the printed side of the printing material is arranged downstream of a press/varnishing nip 3 formed by two cylinders 1, 2.

In a further embodiment, in particular for web printing materials, downstream of the press/varnishing nip 3 formed by the cylinders 1, 2, in each case an applicator device 7 having at least one applicator roll 12 for applying the catalyst mixture to the printing material is assigned to both sides of the printing material.

In an equivalent embodiment, at least one applicator device 7 in each case having a spray device for applying the catalyst mixture to both sides of the printing material is in each case arranged downstream of the press/varnishing nip 3.

Depending on the requirement on the level of drying of the printing ink or of the varnish, at least one dryer device 8 is arranged downstream of at least one, preferably all, of the applicator devices 7.

What is claimed:

1. Method of processing a printing ink containing inhibitors and oligomers in a printing unit of a rotary printing machine having at least two cylinders that form a press nip, comprising the steps of passing sheet material to be printed through said press nip, applying printing ink to said sheet material by at least one of said cylinders as the sheet material passes through said nip, and after the sheet material passes through said press nip applying a catalyst mixture to the printing ink on said sheet material that accelerates the break down of inhibitors contained in the printing ink.

2. The method of claim 1 in which at least one of said two cylinders is a forme cylinder, and applying said printing ink to one side of the sheet material by said forme cylinder, and then applying said catalyst mixture to said printing ink on said one side.

3. The method of claim 1 in which at least one of said two cylinders is a blanket cylinder, applying said printing ink to one side of the sheet material by said blanket cylinder, and then applying said catalyst mixture to said printing ink on said one side of the sheet material.

4. The method of claim 1 in which said two cylinders comprise blanket or forme cylinders, applying said printing ink to both sides of the sheet material by said two cylinders and then applying the catalyst mixture to the printing ink on both sides of said sheet material.

5. The method of claim 1 including thermally drying the printing material after applying said catalyst mixture.

6. The method of claim 1 including turning said sheet printing material over immediately after applying said printing ink.

7. The method of processing a printing ink containing inhibitors and oligomers in a printing unit of a rotary printing machine having at least two cylinders that form a press nip, comprising the steps of passing a sheet material to be printed through said press nip, and applying printing ink and a catalyst mixture that accelerates break down of the printing ink inhibitors to said sheet material by at least one of said cylinders as the sheet material passes through said press nip.

8. The method of claim 7 in which at least one of said two cylinders is a plate cylinder having an associated inking unit, and applying said catalyst mixture to said sheet material passing through said press nip by applying said catalyst material to said plate cylinder by said inking unit.

9. The method of claim 7 in which at least one of said two cylinders is a plate cylinder having an associated damping unit, and applying said catalyst mixture to said printing material by applying said catalyst mixture to said plate cylinder by said damping unit.

10. The method of claim 7 in which at least one of said two cylinders is a forme cylinder having an associated metering system with at least one applicator roll, and applying said catalyst material to said sheet material passing through said press nip by applying said catalyst material to said forme cylinder by said metering system.

11. The method of claim 7 including thermally drying the printed material following applying said printing ink and catalyst mixture to said sheet material.

12. The method of claim 7 including turning the sheet material over after applying said printing ink and catalyst mixture to said sheet material.

13. A rotary printing machine comprising a printing unit having at least two cylinders that define a press nip through which printing material is directed in a conveying direction, an inking unit for applying printing ink containing inhibitors and oligomers to at least one of said two cylinders for application to printing material passing through said press nip, an applicator device having a supply of a catalyst mixture and said applicator device having at least one applicator roll for applying said catalyst mixture to a printed side of the printed material downstream of said press nip for accelerating the breakdown of inhibitors contained in said printing ink.

14. The rotary printing machine of claim 13 including a dryer unit located downstream of said applicator roll for drying said printing material.

15. A rotary printing machine comprising a printing unit having at least two cylinders that define a press nip through which printing material is directed in a conveying direction, an inking unit for applying printing ink containing inhibitors and oligomers to said printing material, an applicator device having a supply of a catalyst mixture, and said applicator device having at least one spray device arranged parallel to axes of said two cylinders and downstream of said press nip for applying the catalyst mixture to a printed side of said printing material for accelerating the breakdown of inhibitors contained in said printing ink.

16. The rotary printing machine of claim 15 including a dryer device located downstream of said spray device for drying the printed material.

* * * * *